Figure 1:
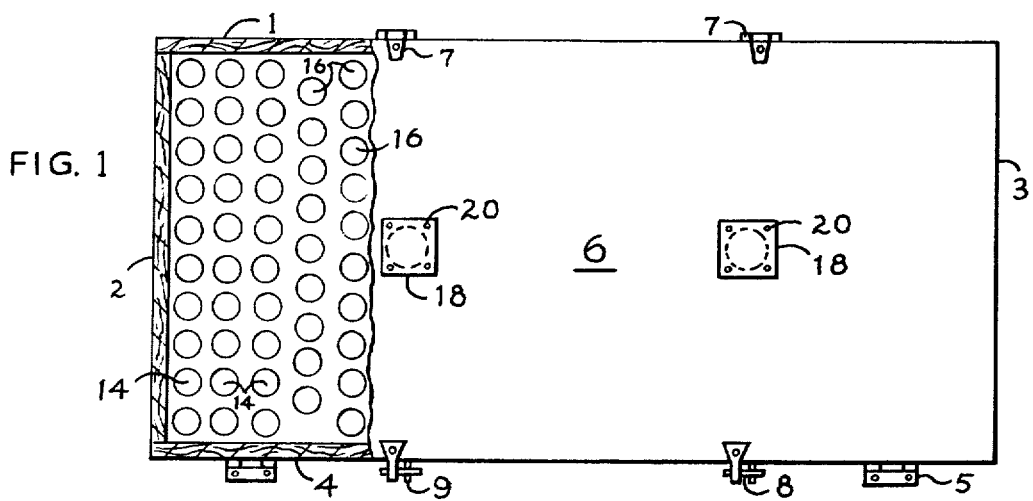

United States Patent [19]

Moore

[11] 3,878,661

[45] Apr. 22, 1975

[54] LIGHT-WEIGHT, CONSTRUCTION UNIT

[76] Inventor: Alvin Edward Moore, Manini Way, Rt. 1, Bay St. Louis, Miss. 39520

[22] Filed: May 14, 1973

[21] Appl. No.: 359,800

Related U.S. Application Data

[63] Continuation of Ser. No. 102,317, Dec. 29, 1970, abandoned.

[52] U.S. Cl. .................. 52/443; 52/382; 52/577; 52/DIG. 9
[51] Int. Cl. ............................................. E04c 1/06
[58] Field of Search .......... 161/68, 69, 135; 52/576, 52/577, 615, 443, 445, 315, 613, 380-382; 181/33 G, 33 GA

[56] References Cited
UNITED STATES PATENTS

| | | | |
|---|---|---|---|
| 584,875 | 6/1897 | Jameton | 52/577 |
| 1,465,653 | 8/1923 | Olander | 52/382 |
| 1,477,520 | 12/1923 | Pittman | 52/576 |
| 1,573,896 | 2/1926 | Alton | 52/445 |
| 1,708,462 | 4/1929 | Bodman | 52/577 |
| 1,777,872 | 10/1930 | Brown | 52/445 |
| 2,043,445 | 6/1936 | Oxhandler | 181/33 G |
| 2,477,852 | 8/1949 | Bacon | 181/33 G |
| 2,633,439 | 3/1953 | Konstandt | 161/68 |

Primary Examiner—John E. Murtagh
Attorney, Agent, or Firm—Cmdr. Alvin Edward Moore

[57] ABSTRACT

A construction unit, usable in exterior or interior walls, ceilings or floors, comprising: cylindrical, gas-material-containing cans, preferably of metal but optionally of dense, strong plastic or glass of the new or used type, having lengths less than 12 times their diameters; and insulating, strength-providing material, surrounding cylindrical portions of the cans and bonding them together into a bar, panel or block. The cans may be new or used, sealed or opened at one end, and the gaseous material in them may be air, helium, other lighter-than-air gas, foam plastic, or other gas-containing insulating material. Optionally, their axes may be: aligned in a row of cans of the same diameter or of different diameters; parallel to each other; or (when they are tumbled into a mold) making angles to each other and parallel to one side of the unit. Optionally a sheet of plywood, lumber or plastic may be fixed to the cans at one or each side of the unit, forming one side, or both sides, of the unit. The invention comprises: a wall of the units and bonding material between them; and a method of making the unit.

2 Claims, 9 Drawing Figures

PATENTED APR 22 1975　　　　　　　　　　　　　　3,878,661

ALVIN EDWARD MOORE,
INVENTOR.

BY
Alvin E. Moore,
ATTORNEY

LIGHT-WEIGHT, CONSTRUCTION UNIT

CROSS REFERENCE TO RELATED APPLICATION

This application is a continuation of application Ser. No. 102,317 filed Dec. 29, 1970, now abandoned.

This invention pertains to a light-weight construction unit and a method of making it.

Building construction units that are now commonly made and used — for example, bricks and concrete blocks — have material that is too heavy and frangible to be practically utilized in a long bar or panel. Some building units of foamed plastic have been designed; but this material when used alone is expensive and weak; and the commonly known steel reinforcing rods are very heavy and costly. Another consideration concerning this invention is the current, civilization-hampering waste and disposal problem of used cans.

In view of these facts, some of the objects of the present invention are to provide: (1) a light-weight, insulating construction unit comprising a plurality of tubular members that contain gaseous material and have molded material (optionally concrete or foam plastic) around them; (2) a construction unit, comprising a plurality of metallic or dense-plastic, cylindrical, short-axis cans in end-to-end arrangement and molded material around the cans; (3) a construction unit, comprising a plurality of such cans arranged with their axes parallel, and molded unit-strength-providing material holding the cans in assembled relation, (4) a construction unit comprising used cans and molded material holding them in assembled relation; (5) a wall comprising a plurality of construction units of any of the above types and means bonding the units together; and (6) a method of making a light-weight, insulating, strong, inexpensive construction unit. These and other objects of the invention are indicated in the attached drawings and the following specification.

Figure 2:
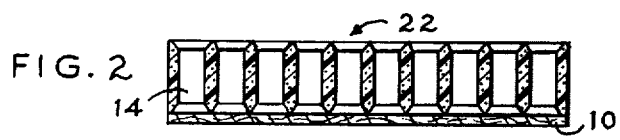
Figure 3:
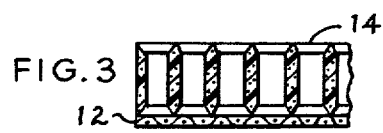
Figure 4:
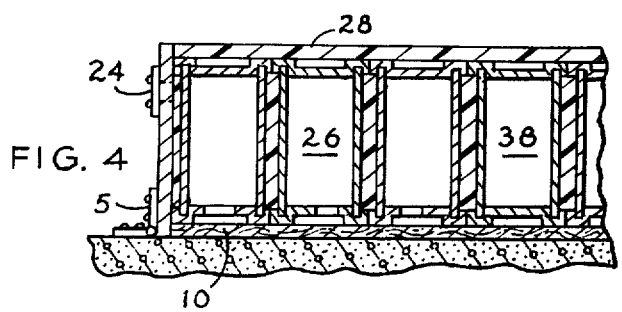
Figure 5:
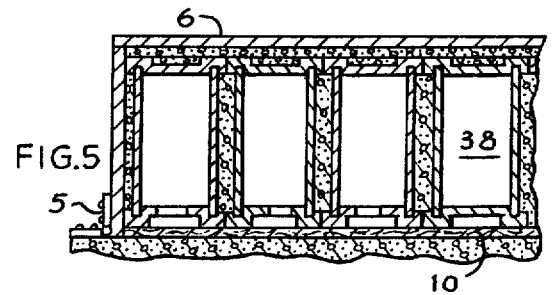
Figure 6:
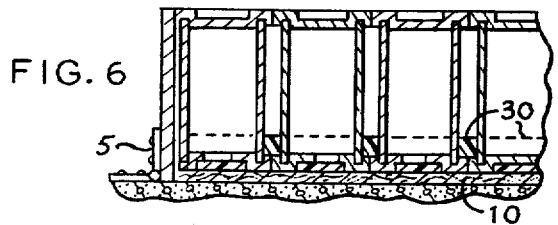
Figure 7:
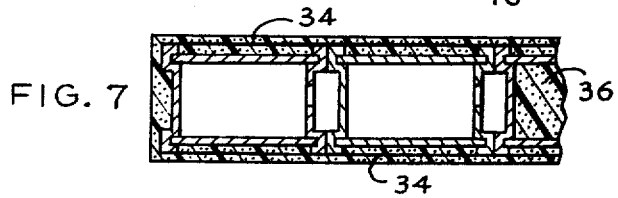
Figure 8:
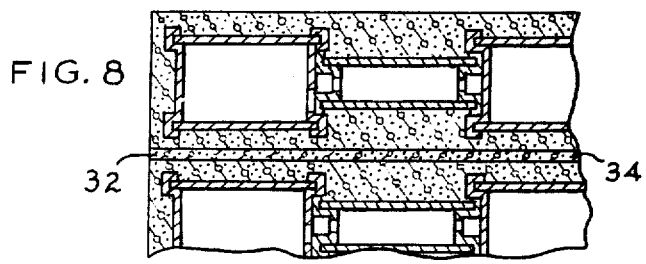
Figure 9:
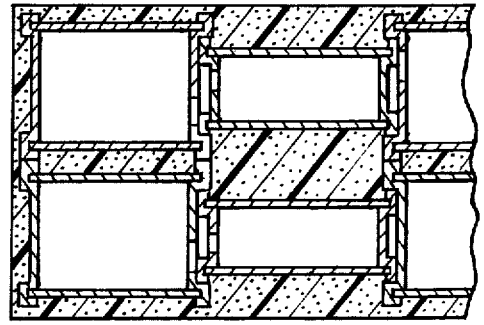

In the drawings: FIG. 1 is a plan view, partly broken away in section along a horizontal plane, showing a plurality of parallel-axes cans in a mold before wet concrete (or liquid mixture of plastic) is inserted into the mold; FIG. 2 is a sectional view of a completed construction unit comprising parallel-axes cans, fixed to a piece of plywood or plank, and molded material (the optional foam plastic is indicated here) around the cans, the view being from a plane containing parallel axes of the cans; FIG. 3 is a similar sectional view, partly broken away, of a construction unit comprising cans and molded material on fabric (preferably wire netting of the poultry-fence type); FIG. 4 is a similar sectional view, partly broken away, of a construction unit that comprises parallel-axes cans (most of which are shown as used cans) and molded material between the cans and between unit-strengthening elements (two pieces of solid strength-providing material), the unit being shown as complete but still in the mold; FIG. 5 is a similar sectional view, partly broken away showing such cans on a base piece of wood and otherwise covered with concrete in a mold; FIG. 6 is a similar sectional view, partly broken away, showing, in a mold, a completed construction unit comprising parallel-axes cans held on a piece of plywood or plank by dense plastic, foam plastic, or concrete (optionally porous concrete), which does not entirely cover the height of the cans; FIG. 7 is a view, partly broken away, in section from a plane containing the axes of a plurality of cans, indicating a bar or panel comprising end-to-end-arranged cans, imbedded in molded material (the optional foam plastic being here shown); FIG. 8 is a view, partly broken away, of a building wall comprising a plurality of construction units, the view being in section from a plane containing the axes of a plurality of end-to-end-arranged cans of different sizes; and FIG. 9 is a similar sectional view, partly broken away, showing a panel or bar comprising two parallel rows of cans in molded material (here shown as foamed plastic).

In each of the construction units illustrated in FIGS. 1 to 9 and described below: the molded, strength-providing material (shown in some figures as concrete and in others as foam plastic) optionally may be either foam plastic or concrete; and the short-axis, cylindrical cans preferably are of metal but optionally may be of dense, strong plastic or of glass (bottles, jars or the like). Preferably the cans are of the standard, comercially-procurable type; preferably their lengths are less than 12 times their diameter.

A mold is shown in FIG. 1 as comprising three wall elements 1, 2 and 3 (shown as of wood but optionally made of metal). Preferably they are fixed to each other in upright position, and also to a base member of wood or dense plastic or to a concrete floor. A fourth wall element, 4, is shown as having hinges 5 that are connected to the base member and allow the element 4 to be pivoted downward after the top or lid 6 is swung off from the completed construction unit. This lid also has hinges (7) which permit it to be pivoted upward after the hooks 8 are released from the eyes 9. This pivoting of the elements 4 and 6 permits easy removal from the mold of the completed construction unit.

The construction unit of FIG. 2 or, alternatively, FIG. 3 is optionally formed in the mold of FIG. 1 in a method comprising the following steps: (1) At the bottom of the mold there is placed a unit-strengthening element, which optionally may be either the piece of plywood or plank shown at 10 in FIG. 2 or the fabric 12 (wire netting, expanded-metal sheet or porous cloth) shown in FIG. 3. On top of this unit-strengthening element cans are placed with their axes parallel and upright. These cans may be either new or the used type, having openings in ends of the cans, shown for example in FIGS. 4 to 8 if new they may be sealed and may contain gas (air or helium), optionally under pressure above that of the atmosphere; if they are used cans their hole-containing ends or caps are turned downward as shown in FIGS. 4 to 6, to prevent the molding material from entering the cans where they have been opened, for example as beer cans. If new cans are utilized the type having lids that close and seal by pressure on them is preferred. Inside the mold the cans may be positioned in orthogonally arranged rows as indicated at 14 or in staggered arrangement as shown at 16. (2) The lid 6 is closed and it and wall element 4 are fastened together by means of the hooks and eyes 8 and 9 (or other releasable fasteners). (3) The caps or small covers, 18, are taken off the mold-inlet hole by removal of the screws 20. (4) The molding materials (foam plastic, which may be of the closed-gas-cell type, or very wet concrete having light-weight aggregate, such as expanded shale or clay, pumice or small globules of foam plastic) in fluid condition are poured thru the inlet holes. (5) The molding materials are allowed to set into molded, firm, strength-providing material. (6) The lid 6 is raised and the wall element 4 is pivoted downward. (7) The completed construction unit is taken from the mold.

Optionally, the first of the above-described method steps may comprise the following sub-steps in the order indicated below: (1A) a coating of adhesive substance — for example epoxy resin or other plastic, asphalt, water putty or other putty — is applied to one of the flat surfaces of the unit-strengthening element 10 (or 12); (1B) cans of the above-described type (preferably used cans that formerly contained liquids — for example beer — and have had holes cut, torn or punched in one end of each can) are pressed into the adhesive coating (preferably with the hole-containing ends of the preferred used cans slightly sunk into the adhesive and in the above-described staggered arrangement); (1C) after the glue has set the sub-assembly of cans on the unit-strengthening element is placed in the mold with sealed ends of the cans projecting above the coated piece of wood or fabric, to points at or near the lid 6, and with opened can ends (if any) contiguous to the piece 10 or 12, which preferably is of solid, stiffly bendable material such as wood or the like, easily penetrable by common nails.

The above-described method in general applies to all the disclosed forms of this invention. The above specific wording of it is slightly modified in making units in which the cans are arranged with their axes parallel to the bottom of the mold (for example: When they are aligned as shown in FIGS. 7 to 9; or when they are dumped into the mold in some disorder and then moved, optionally by shaking the mold, until their axes are parallel to the bottom of the mold and, if present, to element 10 or 12. This variation obviously concerns only (1) or step (1B).

Another optional modification of the above specifically described method concerns the making of a construction unit comprising concrete, as indicated in FIGS. 5 to 9, in a mold that does not necessarily have the inlet holes and caps 18. In this simplified method steps (1) to (4) are changed to the following steps: (1) cans are placed in the mold, and over the element 10 or 12 if it is used; (2) concrete (which may be less wet than that described above) or other unit-strengthening, can-bonding material is poured over and between the cans; and (3) — especially when as is preferred wet concrete or the like is poured all the way to the top of the cans and in a layer over them — a mold top or lid (6) is forced under pressure down into juxtaposition with the top edges of wall elements 1 to 4, for example by a toggle-type clamp (replacing the hooks and eyes 8 and 9), having one end fastened to the wall element 4 and the other on cover 6, or by a motor-operated screw pivotable into a position over 6, adjacent to 4. The hooks and eyes, holding element 4 in upright position, are now hooked together at the corners of elements 2 and 4 and of 3 and 4, with the eyes on elements 2 and 3 and the hooks on element 4. If slightly too much concrete has been poured, the downward force of cover or lid 6 causes the extra concrete to slightly dent the sidewalls of the cans and thus the construction unit is forced into its desired shape and size.

Instead of thus using the hinged lid 6 an unhinged metal plate (lid) of substantial weight may be forced downward over the concrete and cans — manually, by a superposed weight on it, or by a motor-and-screw-activated ram (optionally automatically controlled) that is raised above the mold and out of the way of the concrete-pouring operation until downward force is needed on the concrete. When no lid is used the top portion of the concrete may be skimmed off or troweled down, forming its final planar surface.

The completed unit of either FIG. 2 or FIG. 3 may be used in an upright wall, a ceiling, or a floor. As indicated in these figures, no molded material coats the upper surfaces 22. But if desired the foam plastic or concrete may comprise a layer over these surfaces in the manner indicated in FIG. 5. If used, cut or otherwise opened cans are utilized and the molded material extends to or nearly to the tops of the cans, the lid 6 preferably clamps snugly against these tops, thus holding the cut or torn can ends against the unit-strengthening element (10 or 12, and preventing the cans from floating upward and exposing their gaps to entry of molded material.

The cans of small-scale FIGS. 1 to 3 are shown as not having indented end caps. But preferably the cans used have such ends, one form of which being shown in FIGS. 4 to 9.

The mold of FIG. 5 is like the one indicated in FIG. 1; but in FIGS. 4 and 6 two other, optional types of mold are shown. The mold of FIG. 4 is especially useful when the molded material is foam plastic. Here the fluid, foam-producing mold materials are poured or injected thru one or more inlet holes, after removal of the inlet cap or cover 24. After the cans 26 are placed on element 10 a second unit-strengthening element 28 — for forming a finished surface of the construction unit (of the panel or bar) — is placed over the cans and within the top edges of the mold. Before inserting into the mold the molding materials (if these are foam-plastic liquids) this top element 28 is forcibly clamped in place, by clamps hinged to the mold wall elements or by placing a heavy weight on top of 28. This clamping action prevents rise of this element when the plastic liquids foam and exert pressure inside the mold. When concrete is used as the molding material in the arrangement of FIG. 4 it is poured downward between the cans; and then the cover element 28, preferably having its lower surface coated with glue (for example, epoxy resin, epoxy putty, or water putty), is clamped or weighted down on the upper can ends (or on the thin layer of concrete over these ends if the concrete rises above them).

The mold of FIG. 6 is adapted for use in making very light weight construction units (panels or bars), in which the molded or bonding material, 30, has a thickness less than the height of the cans. The material is indicated as dense plastic, but optionally it may be foam plastic or concrete with light-weight aggregate. If concrete is used the cement preferably is well wetted and has a substantial percentage of lime in it, to cause it to adhere to other materials. In any event, the material 30 is poured from above into the recesses or interstices between the cans; and after it sets it holds the cans in assembled arrangement relative to each other and to the unit-strengthening element 10.

Optionally, the construction unit of FIG. 6 may be made without a mold or only with a can-holding rack or mold having a height about a fourth to a third of that shown in FIG. 6. In this event, the can-fixing concrete (or putty, glue, asphalt or other plastic) preferably is first applied in a coat on the upper surface of the unit-strengthening element 10 (plywood plank, fabric or the like) and the cans are then pressed into this adhesive substance with their opened ends (if any) adjacent to the can-holding material. If no rack is used this coat is preferably epoxy resin and is not as thick as when it is applied in a mold or rack. In any event — whether or not a rack or mold is used — method steps that are similar to the above-described sub-steps (1A), (1B) and (1C) form a completed article of commerce, instead of a sub-assembly. When a low mold or rack is used the coating on the cans may be of the general thickness indicated in FIG. 6 at 30, and it preferably is of concrete. This very light-weight type of panel or bar may be used in making an exterior wall or other structure, but is of especial value in: internal partitions (with plaster applied to the unglued ends of the cans, and into the interstices between these ends); or in interior insultaint walls, with the unglued, sealed can ends pressed into stucco on a concrete, masonry or wood-framed exterior wall.

FIGS. 7, 8 and 9 illustrate construction bars or panels in which the cans are assembled in end-to-end arrangement. Optionally, and as shown, they may not have a unit-strengthing element of the type shown at 10 and 12. In each form the ends of the cans optionally may be bonded together in a coaxial row by glue, solder, brazing or other bonding material and then placed in a mold. IN the form of FIG. 7 the cans have the same diameter; in FIGS. 8 and 9 they are illustrated as having different diameters, alternately placed. When the cans are of the used type the rim of each opened end of a smaller can is sealingly fitted within the larger rim of a large can, and the opened large cans also are sealed by such junctions against entry of fluent-state concrete or plastic.

FIG. 9 illustrates a light-weight panel or bar having two parallel-axis rows of the cans. These rows or parallel axes obviously could number three or more; and if desired none of the axes of numerous separated cans may be in alignment, but as indicated above these axes are parrallel to the bottom of the mold.

FIG. 7 may be considered as in a section thru a wide panel, having a plurality of rows of cans, or a relatively narrow bar, hhaving only oone can row. 1

FIG. 8 shows a wall comprising a plurality of construction units that are stacked and bonded together. The bonding material (mortar, containing portland cement — or other cement, for example epoxy resin or putty) is indicated at 32. Any of the construction units shown in FIGS. 1 to 9 may be thus bonded into an exterioor or interior wall.

Another use for the type of unit indicated in FIGS. 2, 3 or 6 (where the can end on one side of the unit are exposed) is to place the unit with tese exposed can ends jammed into adhesive substance (freshly applied mortar, putty, waterprooof glue or the like) that has been placed on the interior of a masonry, concrete or wood-frame exterior wall. Another method of using this form of unit is to glue the element 10 (or 12) to the interior surface of such an exterior wall, and then to apply stucco or plaster to the exposed can ends, forcing the stucco or plaster a short way into the recesses between cans. Many tongues of plaster thus are formed, making a very strong, well insulated wall.

Various modifications of the structure may be made within the scope of the following claims. For example,: light-weight concrete-reinforcement elements 34 (single wires, narrow strips of wire netting (for example of poultry-typee fence wire) or lengths of pipe strap) optionally may be imbedded in molded material on one or more sides of any of the unit forms; glue or other adhesive substance optionally may be placed between the juxtaposed cans of any of these forms to hold either their ends or sides together; and the gaseous material in any of the cans, instead of the preferred can-coontained air may be: foam plastic, as indicated at 36 in FIG. 7; other gas-containing insulating material; or helium or other lighter-than-air gas in sealed cans of the type indicated in FIGS. 4 and 5 at 38.

In the claims: the word "can" signifies a hollow, cylindrical article, open or sealed, of metal, dense plastic or glass amnd "plastic" means any natural or synthetic plastic.

I claim:

1. As a lightweight article of commerce, an easily transportable wall element adapted for assembly with other, similar elements in a building structure and for receiving surfacing material after said assembly, the said wall element consisting of:
   a single, planar, stiff, wooden base, forming a flat side of the wall element;
   a plurality of used, metallic cans of beverage-containing type arranged on said base with their axes paralleling one another and normal to the plane of said base, each of said cans consisting of a cylindrical tube and a pair of tube-closing, individual end plates that are fixed to opposite ends of said tube;
   means defining a used-can opening in part of only one of said end plates of each can, the other end plate of each of said cans being closed;
   a coating of adhesive substance, holding and bonding the partially opened ends of said used cans on and adjacent to said base;
   a layer of porous plastic in contact with and distinctive from said coating, in contact with major portions of said tubes of the cans, located in spacex between adjacent pairs of said cans and extending from said coating outward a distance toward said other closed can-end plates, the said distance being less than the axial length of the cans;
   the said closed can-end plates and adjacent portions of said tubes having vacant spaces between them, ambient air being in said vacant spaces;
   the said vacant spaces being adapted to hold and contain stucco when the said article is adjacent to other, similar articles in a building structure.

2. An article as set forth in claim 1, in which: the said end plates have rims, projecting radially outward from said tubes; and the said porous plastic is foamed plastic.

* * * * *